US006484845B1

(12) United States Patent
Schleicher et al.

(10) Patent No.: US 6,484,845 B1
(45) Date of Patent: Nov. 26, 2002

(54) METHOD AND SYSTEM FOR INFLUENCING POSSIBLE STRUCTURE-BORNE SOUND CONDUCTIONS AND POSSIBLE NOISE RADIATIONS OF OBJECTS

(75) Inventors: Ruediger Schleicher, Stuttgart (DE); Juergen Schnur, Ditzingen (DE); Silvia Tomaschko, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/332,114

(22) Filed: Jun. 14, 1999

(30) Foreign Application Priority Data

Jun. 13, 1998 (DE) ........................................ 198 26 175

(51) Int. Cl.[7] ................................................ F16F 15/00

(52) U.S. Cl. ........................ 181/207; 181/208; 181/200

(58) Field of Search ................................ 181/207, 208, 181/209, 202, 200, 286, 290, 294, 295

(56) References Cited

U.S. PATENT DOCUMENTS 4,374,172 A * 2/1983 Schwarz et al. ............ 181/294
5,241,512 A * 8/1993 Argy et al. ................. 181/207
5,332,061 A 7/1994 Majeed et al.
5,434,783 A 7/1995 Pal
5,473,125 A * 12/1995 Stief et al. .................. 181/290

FOREIGN PATENT DOCUMENTS

| | | | |
|---|---|---|---|
| DE | 195 31 402 | A1 | 2/1997 |
| EP | 0 693 748 | A2 | 1/1996 |

* cited by examiner

*Primary Examiner*—Khanh Dang
(74) *Attorney, Agent, or Firm*—Crowell & Moring LLP

(57) ABSTRACT

A method and a system for influencing possible structure-borne sound conductions and possible noise radiations of objects which have at least two at least indirectly mutually adjoining and mutually connected components. A spacer body is arranged in the area of the at least indirect mutual adjoining “contact area”. As the result of the spacer body, which can be controllably influenced in its geometry, one of the two mutually connected components and the components which, with respect to the conduction of the structure-borne sound have different acoustic impedances can be excited in a simple manner to carry out vibrations.

36 Claims, 6 Drawing Sheets

METHOD AND SYSTEM FOR INFLUENCING POSSIBLE STRUCTURE-BORNE SOUND CONDUCTIONS AND POSSIBLE NOISE RADIATIONS OF OBJECTS

BACKGROUND AND SUMMARY OF THE INVENTION

This application claims the priority of 198 26 175.6, filed Jun. 13, 1998, the disclosures of which is expressly incorporated by reference herein.

The invention relates to a method and a system for influencing possible structure-borne sound conductions and possible noise radiations of objects which have at least two at least indirectly mutually adjoining and mutually connected components, a spacer body being arranged in the area of the at least indirect mutual adjoining—in the following, simplified as "contact area".

Examples of such objects are bodies of motor vehicles, such as passenger cars and trucks, airplanes or train cars and the like, casings of machines, internal-combustion engines, machine or engine parts, or machine or motor components, but also framed glass, such as window panes arranged in window frames.

A method for suppressing vibrations introduced into the vehicle body and a corresponding vehicle are known from U.S. Pat. No. 5,332,061. The concerned introduced vibrations originate from the engine and are transmitted to the connection points of the engine with the vehicle body. For damping these vibrations, the vehicle has "shakers", thus mechanical vibration exciting devices which are arranged in the area of at least some connection points of the engine with the vehicle body. When the engine is operated, the shakers are excited as a function of the rotational engine speed at the resonance frequencies in the opposite phase to the vibrations coming from the engine, whereby the transmission of the introduced vibrations is at least partially damped. The corresponding frequencies and their amplitudes for the secondary vibrations are taken from a previously filed data field.

From U.S. Pat. No. 5,434,783, a vehicle is known in the case of which the sound effects audible within a passenger compartment are influenced by sound waves. In addition to normal loudspeakers, a piezoelement is also used here which excites the vehicle body at least in an area to carry out vibrations and thereby influences it to emit sound waves; that is, the piezoelement acts like the coil of a loudspeaker, while the vehicle body represents the vibrating membrane. By means of the known method and the known system, an improvement of the subjective sensation is achieved within the occupant compartment.

A further development of the above approach for influencing the subjectively perceived driving sensation is known from German Patent Document DE 195 31 402 A1. According to this document, as a function of a parameter and in this case particularly of the rotational engine speed and/or of the velocity, not only the airborne sound but also the structure-borne sound perceived by means of the body and vibrations are influenced. For this purpose, depending on the extent of the parameter, certain data are read out of a data field and are converted by means of vibration exciting devices, in secondary vibrations which among other things are also perceived on the structure. By means of this measure, in conjunction with the influencing of the acoustically perceived airborne sound, positive as well as negative interferences of the artificial secondary vibrations can be generated with the primary vibrations which form on the vehicle side when the vehicle is operated. As desired, the interferences can reduce the perceived impression or simulate a certain impression, for example, a shifting in the case of a vehicle equipped with an infinitely variable speed transmission.

However, the above-mentioned measures require considerable expenditures. Furthermore, they still require the use of weight-increasing sound-absorbing mats made of a sound-absorbing material.

It is an object of the invention to develop a method and a system by means of which an influencing of noises can be carried out in a novel manner, which noises come from objects which have at least two at least indirectly mutually adjoining and mutually connected components.

According to the invention, this object is achieved by providing a method for influencing at least one of structure-borne sound conductions and noise radiations of objects which have at least two at least indirectly mutually adjoining and mutually connected components, a spacer body being arranged proximate an at least indirectly mutually adjoining area, wherein said spacer body has a controllably influenceable geometry, and wherein the components connected with one another by way of the spacer body are dimensioned with different acoustic impedances with respect to the conduction of the structure-borne sound.

According to the invention, this object is achieved by providing a system for influencing at least one of structure-borne sound conductions and noise radiations of objects which have at least two at least indirectly mutually adjoining and mutually connected components, a spacer body being arranged proximate an at least indirectly mutually adjoining area, wherein the spacer body has a controllably influenceable geometry, and wherein the components which are mutually connected by way of the spacer body have a different acoustic impedance with respect to the conduction of the structure-borne sound.

As the result of the arrangement of spacer bodies, preferably piezoelements arranged in active seals which, at least in areas, can be influenced in a controlled manner in their geometry, the transmission function for vibrations between the individual components of the object can be changed in a simple manner. This is a special advantage particularly in the claimed inventive context by means of the different acoustic impedances of the concerned components. In this combination, the one, acoustically hard component acts as a supporting body for the second, acoustically softer component; that is, the hard component virtually forms a fixing point for the acoustically softer component which can therefore easily and at low-energy be excited to carry out vibrations.

This becomes particularly favorable starting at an impedance ratio of the two components with respect to one another which is lower than 1:2, preferably lower than 1:5 and particularly preferably lower than 1:10.

Expediently, these spacer bodies are additionally also arranged in the area of a high and/or of the maximum mode density of the structure-borne sound, particularly in a joint or in a flange or a partition line between the two components.

In particular, the invention can be used for reducing noise inside an enclosed space. In the same manner, it is possible to influence in a preferably minimizing manner the sounds transmitted to the outside.

The invention is particularly advantageous in the construction and/or of the, in particular, wheel-side fastening of panels, of casing plates, of window panes, of covering parts, particularly of metal body sheets of a vehicle or of an airplane. Furthermore, this also applies to the construction and fastening of, for example, an oil pan on a crankcase, a cylinder block of an engine, an engine mount of an engine or of an engine bearing of an engine mount since, as the result of the invention, a complicated ribbing-out of components which increases the acoustic impedance and thus mass can at least partially be eliminated.

On the whole, this, among other things, reduces costs, which is the result of a simplification of the demands on construction, of a simplified component geometry, which saves casting expenses, etc., as well as of a possible reduction of sound-absorbing measures, by means of, for example, sound-absorbing mats, and the like.

Other objects, advantages and novel features of the present invention will become apparent from the following detailed description of the invention when considered in conjunction with the accompanying drawings.

DETAILED DESCRIPTION OF THE DRAWINGS

Figure 1:
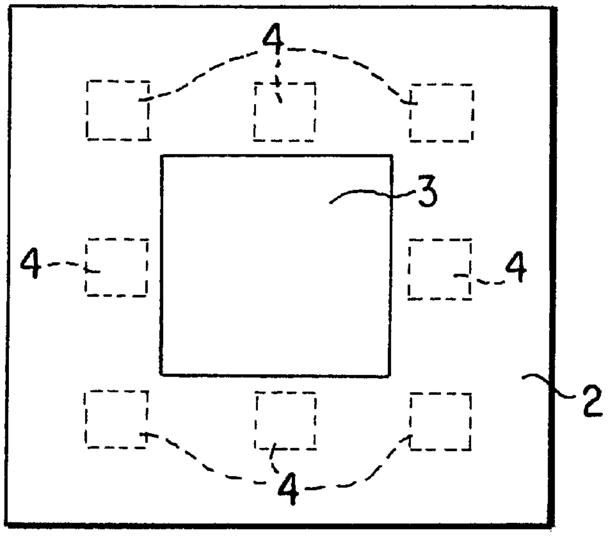
FIG. 1 is a top view of a first component which, in a frame-type manner, is surrounded on both sides by a second component.

FIG. 1 is a view of a cutout of an object which has a first plate-type component 3 which is surrounded on both sides by a second component 2 in the manner of a frame. In the transition area between the two components 2 and 3, a seal is arranged on both flat sides of the first component 3. This object may, for example, be a window whose window pane (first component 3) is surrounded by a window frame (second component).

Depending on the advantages in the respective application, the piezoelements may, for example, be massive and/or may be formed of several individual layers of, in particular, foil-type and/or pane-type piezoceramics which are placed upon one another. With respect to the massive construction of piezoelements, in the case of the multi-layer systems, the tension is reduced while the stress and the active surface are the same, while the current is increased.

On the flat sides of the first component 3, vibration exciting devices are arranged as spacer bodies on the frame side, specifically in the area of the transition between the second component 2 and the first component 3. The vibration exciting devices are expediently piezoelements 4 which, in the present case, are arranged separately and independently of one another and which rest at least indirectly against the second component 2 and the first component 3. The piezoelements 4 are preferably arranged at locations at which, because of a transmitted vibration, the highest power flux and/or the largest amplitude or the highest mode density of the transmitted vibration is to be expected.

The arrangement illustrated in FIG. 1 forms a device for influencing sounds which are the result of both components 2 and/or 3. These sounds may, for example, be wind-caused noises which are transmitted as vibrations by way of the plate-shaped first component 3. They may, in addition, also be vibrations which are transmitted by way of the frame-type second component 2 and excite the first component 3 to carry out vibrations which, among other things, can be perceived as noise. Particularly in the case of motor-driven vehicles, such as airplanes, trains, buses as well as, in particular, in the case of trucks and/or passenger cars, these sounds are of special interest with respect to the sound effects which can be perceived in the interior. The same applies to the sound radiation to the outside.

Instead of the arrangement known from FIG. 1, the piezoelements 4 may expediently also be integrated in a seal which usually already exists. In contrast to a normal passive seal 8, such a seal will be called an active seal 1 in the following.

Figure 2:
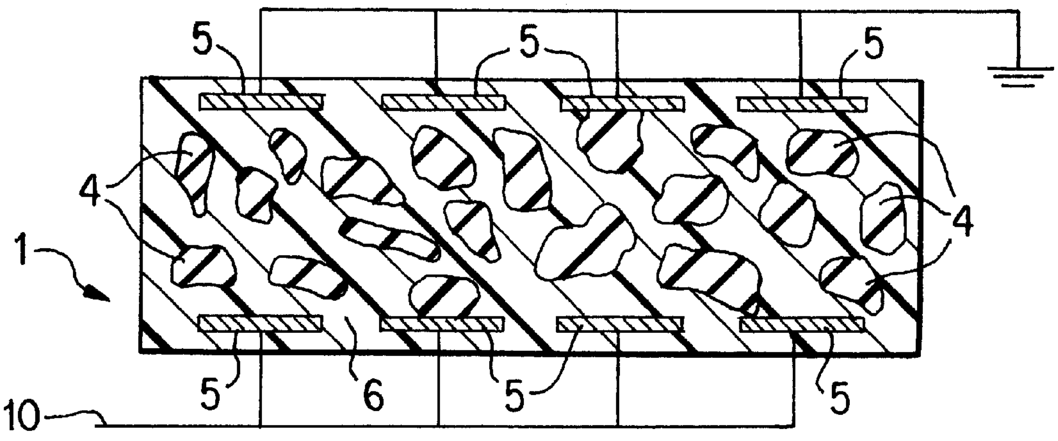
FIG. 2 is a sectional view of an active seal having piezoelements, which are statically arranged therein, and pertaining electric contacts.
Figure 3:
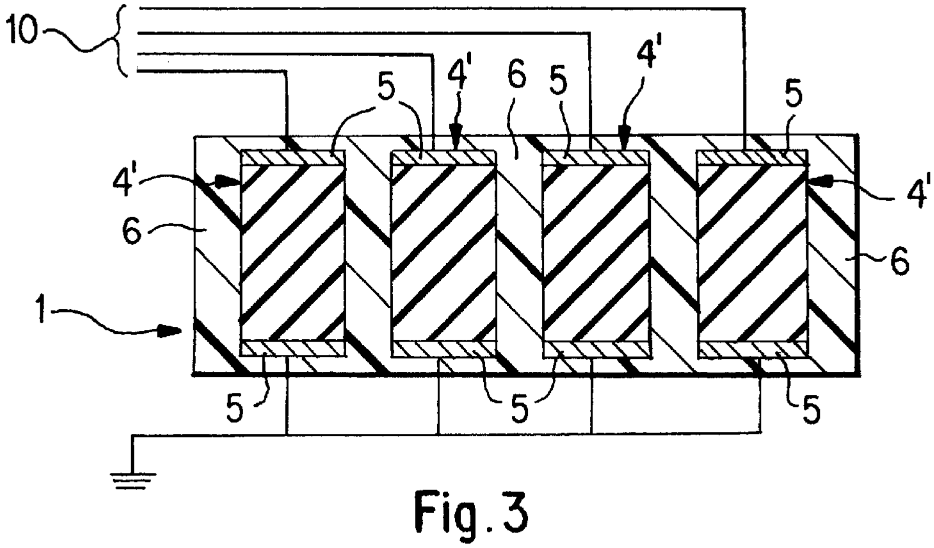
FIG. 3 is a sectional view of an active seal with piezoelements arranged therein in an oriented manner as well as pertaining electric contacts.
Figure 4A:
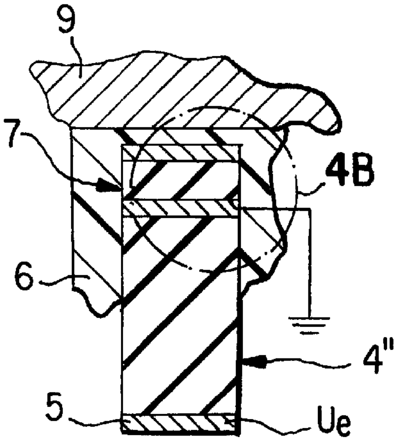
FIG. 4 is a sectional view and a corresponding cutout enlargement of an active seal with piezoelements arranged therein in an oriented manner, piezoelectric sensors as well as pertaining electric contacts.
Figure 4B:
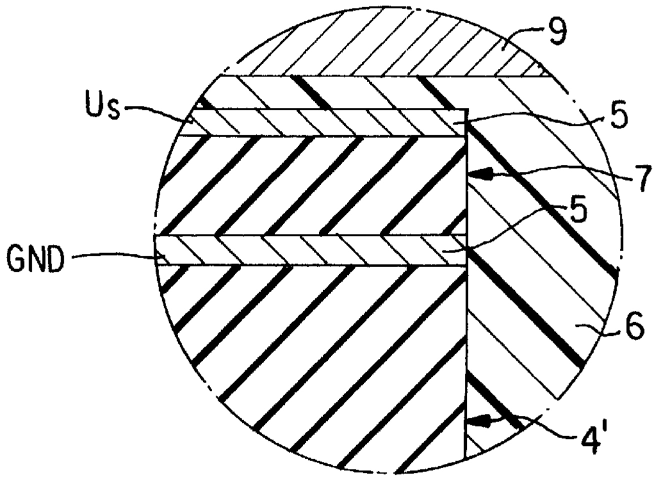

Several possibilities for the construction of such active seals 1 are illustrated in FIGS. 2 to 4.

FIG. 2 illustrates a seal 1 with a matrix 6 made of a preferably electrically conductive plastic material in which several piezoelements 4 of an arbitrary size, orientation and physical design are embedded. Such an arrangement is generally called a 0-3-piezoceramic polymer composite. In the area of the walls, electric contacts 5 are advantageously arranged which are connected by means of electric control lines 10 with a control unit (not shown).

By means of the electric contacts 5, the individual piezoelements 4 can, on the one hand, be controlled in a targeted manner and, on the other hand, it is possible to tap an electric voltage which can be generated, for example, in that the transmitted vibrations exercise a pressure onto the piezoelements 4 and deform them.

In a simple case, a seal 1 may have no electric contacts 5. In this case, a deformation of the piezoelements 4 resulting from transmitted vibrations leads to an electric voltage. The electric voltage is converted here into a heating of the seal 1, whereby the system is also damped.

FIG. 3 illustrates an active seal 1 with a plastic matrix 6 in which several piezoelements 4 are embedded. In contrast to the embodiment according to FIG. 2, these piezoelements are of a defined size and shape and, in addition, are arranged in an oriented manner. Such an arrangement is generally called a 1-3 piezoceramic polymer composite.

In the area of the walls of the seal 1, electric contacts 5 are also arranged which are also connected by means of electric control lines with a control unit (not shown). In contrast to the seal according to FIG. 2, in the case of the seal of FIG. 3, each individual piezoelement 4' is electrically contacted and thus can also be controlled separately and individually.

By way of the electric contacts 5, the individual piezoelements 4' can be excited in a targeted manner to carry out secondary vibrations with the desired frequencies and amplitudes. The secondary vibrations can enter an interference with the transmitted vibrations and/or may be superimposed on them. In the case of a negative interference, the noises which previously were perceived without this influence can be at least reduced, while, in the case of a superimposing of sound, for example, a desired superimposing by means of music or a spoken message is possible.

The piezoelements 4' of the seal 1 are preferably constructed in the form of piezostacks and/or are arranged in a lamella-type manner and in this case in particular aligned behind one another in the seal 1.

During the manufacturing of the seal 1, the thus arranged piezoelements 4' are expediently also electrically contacted before the embedding into the plastic material forming the matrix 6 of the seal. So that the seal 1 continues to carry out its normal purpose, the plastic material forming the matrix is preferably made of a polymer and particularly of an elastomer.

FIG. 4 illustrates an active seal 1 with a plastic matrix 6 in which several piezoelements 4" are embedded with assigned piezoelectric sensors 7. The piezoelements 4" are largely similar to those according to FIG. 3.

However, in the direction of their active axis, they are followed by a preferably piezoelectric sensor 7. The sensor 7 has an electric contact 5 together with the piezoelement 4" as well as an additional electric contact 5. The common contact 5, which is arranged between the piezoelement 4"0 and the sensor 7, is expediently grounded or on an electric zero potential.

By way of the electric contacts 5, the individual piezoelements 4" can be excited in a targeted manner to carry out secondary vibrations with desired frequencies and amplitudes. The secondary vibrations can enter an interference with the transmitted vibrations and/or may be superimposed on them. In the case of a negative interference, the noises which previously were perceived without this influence can be at least reduced, while, in the case of a superimposing of sound, for example, a desired superimposing by means of music or a spoken message is possible.

Advantageously, in the case of such a seal 1, by means of the sensor 7, a residual vibration, which remains after the desired excitation of the piezoelements 4", can be determined and controlled correspondingly. Together with the pertaining electronic system, this piezo/sensor element 4" therefore forms a control circuit. For this reason, it is, among other things, advantageous to arrange the sensor 7 in the power flux direction and/or in parallel to the deflection direction of the amplitude to be expected of the transmitted vibration behind the excitable piezoelement 4".

By means of the individual electric contacting of each sensor 7 and of the respective piezoelements 4", the determination of the residual vibration and the introduction of the secondary vibration can take place with a good resolution and flexibility.

Figure 5:
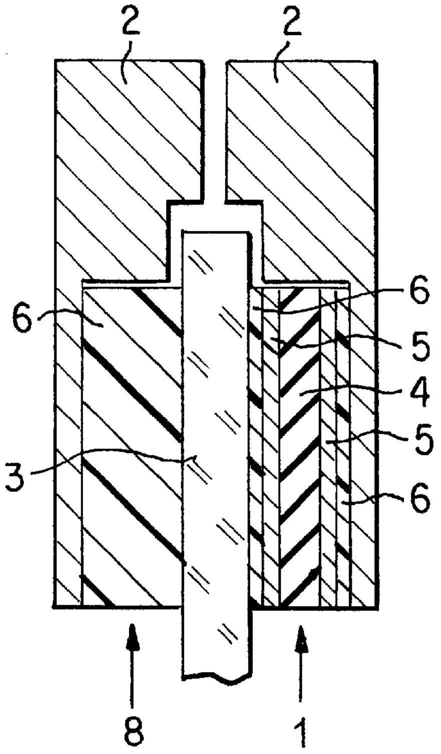
FIG. 5 is a sectional view transversely to the surface of the first components of an arrangement according to FIG. 1 with an active and a passive seal.
Figure 6:
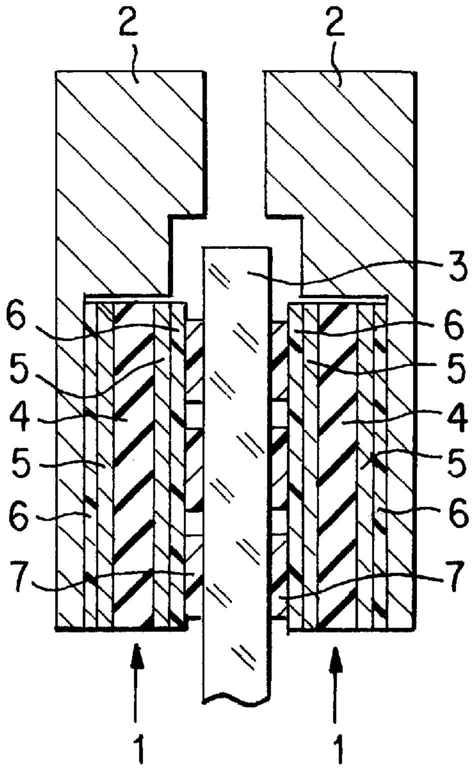
FIG. 6 is a sectional view transversely to the surface of the first component of an arrangement according to FIG. 1 with active seals as well as additional sensors.

Possible arrangements of the active seals 1 described in the preceding figures are illustrated in FIGS. 5 and 6. In all these embodiments, the first component 3 is surrounded in a frame-type manner on its edge area on both its flat sides by means of the second component 2.

FIG. 5 is a sectional view transversely to the surface of the first component 3 of an arrangement according to FIG. 1. The second component 2 is constructed in two parts in the area of its overlapping with the first component 3, so that the first component 3 is surrounded on the edge side on its two flat sides. In the area of the overlapping, a passive seal 8 is arranged on the left and an active seal 1 is arranged on the right. The passive seal 8 is of a conventional construction, while the active seal may have one of the constructions illustrated in FIGS. 2 to 4. The most versatile use is provided particularly by the type of an active seal illustrated in FIG. 4.

The sectional view of FIG. 6 largely corresponds to that of FIG. 5. However, in this case, active seals 1 are arranged on both flat sides of the first component 3. In addition, in this embodiment, sensors 7 are also arranged between each flat side of the first component 3 and the seals 1.

Figure 7:
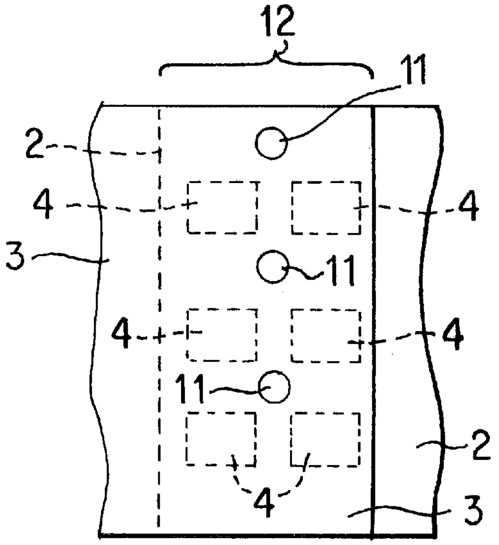
FIG. 7 is a top view of an object, in the case of which a first component is connected with a second component in an overlapping manner.

FIG. 7 illustrates a cutout of an object which has a first plate-type component 3 which is arranged to be overlapping with a second component 2. In the contact area 12, in which the two components 2 and 3 overlap, they are connected with one another by means of fastenings 11, such as screws, snaps, weld points and the like.

Furthermore, an active seal 1 is arranged in the contact area 12 between the two components 2 and 3. An object of this type may, for example, be two metal body sheets but also mutually abutting parts, such as the engine block and the cylinder head.

The construction of the active seals 1 corresponds to that of FIGS. 2 to 4, and will therefore not be discussed here in detail again.

As described by means of the above system of FIG. 1, the system according to FIG. 7 is also suitable for influencing noise. The sounds occurring here may, among other things, be vibrations which are transmitted particularly in the case of a vehicle body or a machine part by way of the vehicle body or a casing. Such vibrations can be transmitted by one component by way of the contact area 12 to the component which follows in the propagation direction and can be perceived as a preferably disturbing noise. Mainly in the case of motor-driven vehicles, such as planes, trains and buses, as well as particularly also in the case of trucks and passenger cars, these sounds may originate from the engine and be of special interest for the sound effects which can be perceived in the interior. The same applies to the sound radiation to the outside.

Figure 8:
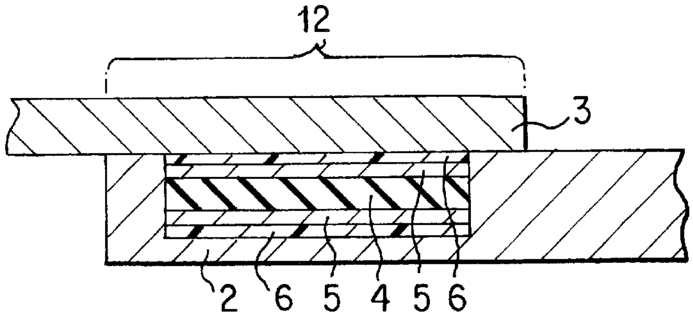
FIG. 8 is a sectional view transversely to the surface of the first component of an arrangement according to FIG. 7 having an active seal.
Figure 9:
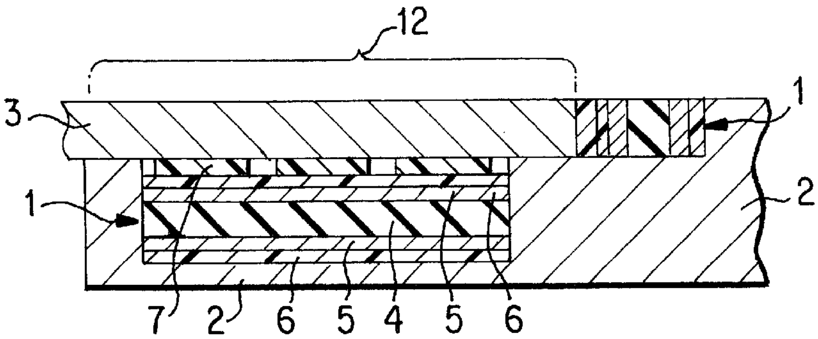
FIG. 9 is a sectional view corresponding to FIG. 7, the arrangement in the overlapping and joint area having one active seal respectively and additional sensors.

FIGS. 8 and 9 show possible arrangements of the active seals 1 in the case of overlapping components described in FIGS. 2 to 4.

FIG. 8 is a sectional view transversely to the surface of the first component 3 of an arrangement according to FIG. 7. The second component 2 has an indentation in the contact area, in which indentation an active seal 1 is arranged, particularly in a location-defined and/or position-defined manner. In this case, the piezoelements of the seal 1 are arranged particularly where the amplitudes or the highest mode density and/or the strongest pressure change must be expected, thus in the range of the highest power fluxes of the transmitted vibrations.

The sectional view illustrated in FIG. 9 corresponds largely to that of FIG. 8, in which case, in addition, sensors 7 are also arranged between the flat side of the first component 3 and the seal 1.

On the whole, in the case of the invention, as the result of the use of the piezoelements 4, 4' and 4", the transmission function can be changed between the second component 2 and the first component 3 as well as vice-versa. When piezoelements are used which can be controlled in a regulated manner or active seals 1 with such piezoelements are used, this can advantageously take place even in a variable and reversible manner so that the possibilities are improved for having an influence and particularly for a detuning.

Figure 10:
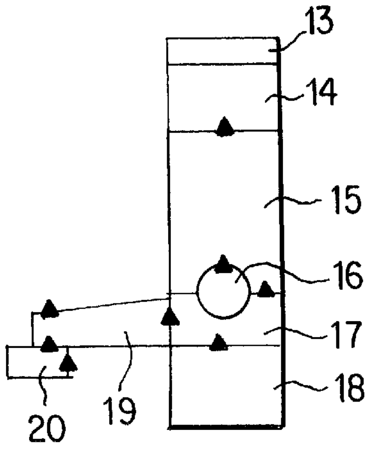
FIG. 10 is a schematic representation of a frontal view of an engine with the transmission and possible positions for arranging active seals.
Figure 11:
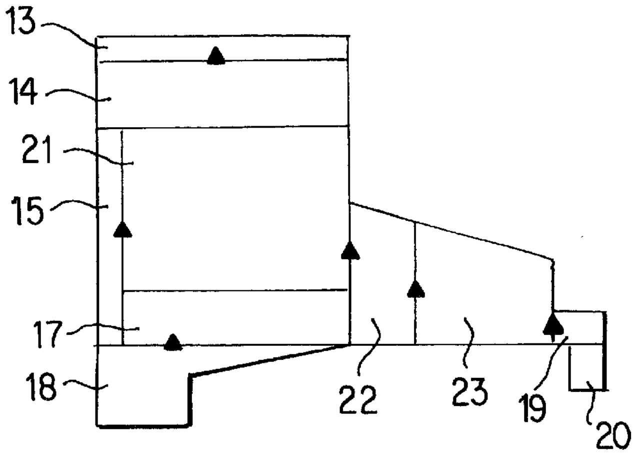
FIG. 11 is a lateral view according to FIG. 10.

FIG. 10 is a schematic representation of a frontal view of an in-line engine with a transmission and possible positions for the arrangement, particularly of active seals 1. FIG. 11 is a lateral view of the corresponding engine. The in-line engine according to FIGS. 10 and 11 has a valve cover 13, a cylinder head 14, an engine block 15 which forms the crankcase and has a crankshaft housing 17, a crankshaft 16 arranged in the crankcase, an oil pan 18, a cover 21, an engine mount 19, an engine bearing 20, a clutch housing or automatic transmission housing 22 and a gear case 23.

The possible arrangements of active seals 1 are indicated by means of triangles. They are situated mainly in a partition line between two of the above-mentioned components. In particular, a corresponding arrangement of a piezoelement also on the crankshaft 17 is advantageous 17, because a targeted intervention can then take place at the site of the occurrence of a transmitted vibration.

A special advantage in this case is the different acoustic impedance of the two components, because the harder component represents an apparent fixing point for the piezoelements 4, 4', 4" in the manner of an apparently fixed support—and can therefore virtually be supported thereon—, whereby the softer component can be excited in a simple and energy-saving manner, to carry out artificial vibrations.

Figure 12:
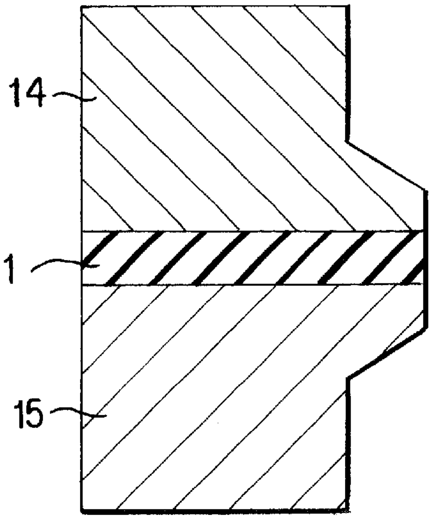
FIG. 12 is a view of an active seal in the joint area between the cylinder head and the engine block.
Figure 13:
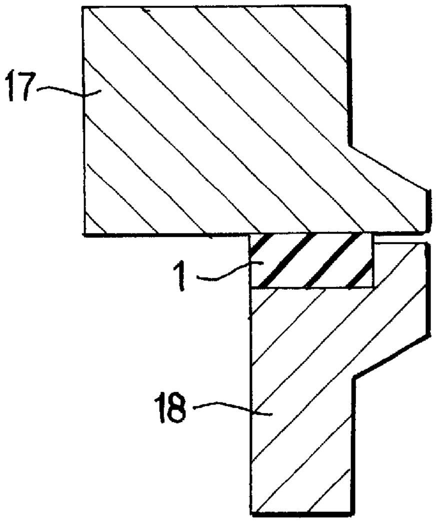
FIG. 13 is a view of an active seal between the crankcase and the oil pan.

This circumstance is illustrated particularly by means of the two FIGS. 12 and 13. Thus, FIG. 12 shows an active seal 1 in the joint area between the cylinder head 14 and the engine block 15, and FIG. 13 shows an active seal 1 between the crankshaft housing 17 and the oil pan 18. In both cases, the active seal 1 is arranged in the joint area between the two respective components.

If, in this case, the engine block 15 or the crankshaft case 17 is constructed with a high acoustic impedance, thus in an acoustically hard or rigid manner, the corresponding component can be constructed in a simple and acoustically soft fashion because it can easily be excited by the respective active seal 1 to carry out countervibrations which counteract the transmitted vibration.

However, with respect to the construction of such components, this is a technical teaching which is completely in contrast to the previously valid teaching. The latter indicates that, in the case of such components, both components must be constructed to be as acoustically hard as possible, so that a transmitted vibration causes an excitation which is as low as possible with respect to the component which follows.

In the following, the method according to the invention will be described by means of two examples. In both cases, the first component 3 is a metal body sheet of a vehicle body, which is surrounded by a flow of air. The second component 2 may be a frame part of the vehicle body or also a metal body sheet by means of which vibrations are transmitted to the first component 3. Both excitations of the first component 3 (flowing air and vibrations transmitted by the vehicle body) form part of the noise effect which can be perceived in the interior of the motordriven vehicle, particularly of an automobile, an airplane or a train car and is even noticeable at lower frequencies.

EXAMPLE 1

In the case of a system according to Example 1, the first component 3 has a seal on both sides, similar to the seal 1 illustrated in FIG. 2. No electric contacts 5 for the piezoelements 4 are arranged in this seal 1.

As the result of turbulently flowing air, pressure fluctuations occur along the exterior flat side of the first component 3, which pressure fluctuations excite the first component 3 to carry out vibrations. In the area of the second component 2, these vibrations cause changing pressure courses or power fluxes in the seal 1. The changing pressure courses and power fluxes form that portion of the transmitted vibrations whose excitation comes from the outside. Another portion of the transmitted vibration is transmitted from the vehicle body by way of the second component 2 to the first component 3. These transmitted vibrations also cause changing pressure courses and power fluxes in the seal 1 in the area of the second component 2.

As a result of these pressure fluctuations or power fluxes, the crystal lattice of the piezoelements 4 arranged in the seal 1 is changed with respect to its quiescent charge. The change from the quiescent position is connected with an energy consumption, which energy is withdrawn from the transmitted vibration and is converted to electric energy. This energy is then transmitted in the form of heat to the plastic material of the matrix 6 of the seal 1. On the whole, as a result of this process, the total energy and/or the composition of the frequencies of the vibrations transmitted by way of the window frame 2 and/or by way of the window pane is reduced. The reduction of the total energy of the transmitted vibration represents a damping and causes a reduction of the perceivable sounds coming from the first component 3.

EXAMPLE 2

In the case of a system according to Example 2, an active seal 1 is arranged between the first component 3 and the second component 2, which active seal 1 corresponds to that according to FIG. 4.

As in the case of Example 1, as the result of pressure fluctuations or power fluxes, the crystal lattice of the piezoelements 4 arranged in the seal 1 is changed with respect to its quiescent charge or quiescent position.

The thus transmitted vibration is also sensed by the sensors 7. By means of an electronic analyzing system, which is not shown but is sufficiently known, and the known mathematical algorithms (Fourier Transformation, etc.), the composition of the transmitted vibration can be determined with respect to its frequencies and its pertaining amplitudes.

On the basis of the determined values for the transmitted vibration, data are now generated by means of which the piezoelements of the active seal 1 are controlled and are excited to carry out a secondary vibration. In the case of the secondary vibration, all present frequencies but also discrete frequencies can be taken into account. In the case of the limitation to discrete frequencies, the constructional and the logistic expenditures and thus also the costs for a system according to the invention and for a process according to the invention are lowered.

The transmitted vibration is caused to interfere with the artificially generated secondary vibration. The total energy of the residual vibration remaining after the interference is at least lower than the total energy of the originally present transmitted vibration. The reduction of the total energy of the transmitted vibration represents a damping and causes a reduction of the perceivable noises coming from the window pane 3. The remaining residual vibration can also be measured by means of the sensors 7. In this case, particularly as before, the residual vibration can be correspondingly influenced in the case of the transmitted vibration. On the whole, this therefore is a controlled system.

Figure 14:
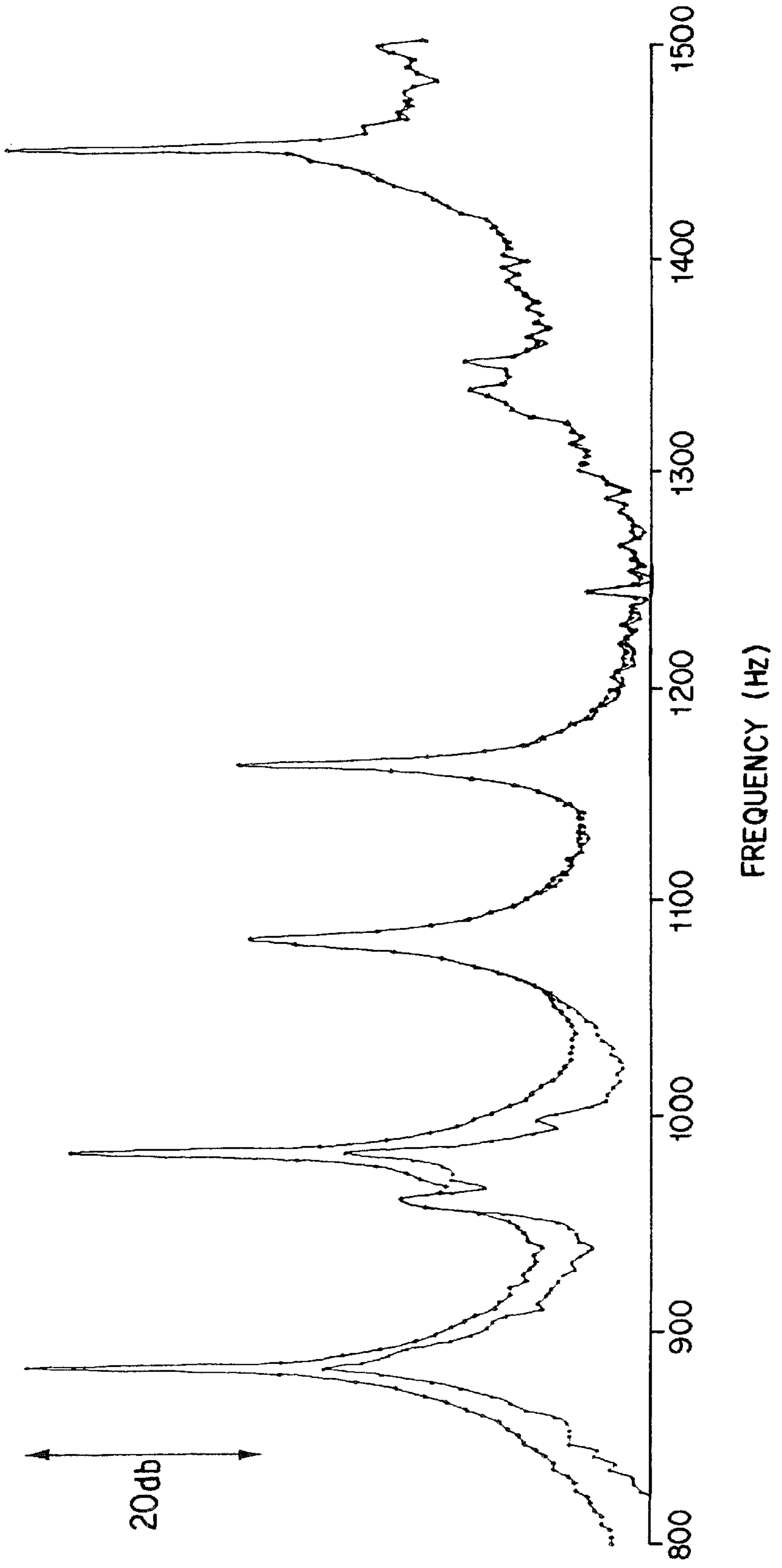
FIG. 14 is a diagram of an airborne noise level emanating from an oil pan with and without the influence according to the invention.

The result of an influencing of an arrangement according to Example 2 is illustrated in FIG. 14. FIG. 14 shows a diagram of a sound level of an oil pan with and without the process according to the invention. The uninfluenced result is represented by the upper curve; the result with an influencing according to the invention is represented by the lower curve.

The diagram illustrates a so-called 1 kHz octave level and was recorded between 800 Hz and 1,500 Hz. The distance of the microphone was 1 m, and the piezoelements were tuned to the two highest amplitudes of the transmitted vibration of 880 Hz and 980 Hz. However, the local arrangement of the piezoelements in the joint between the two components was not optimized.

As illustrated by a comparison between the upper curve and the lower curve, the reduction particularly of the 880 Hz amplitude was 20 dB; that at 980 Hz is not significantly lower. When the piezoelements were switched off, the airborne sound level was 80 dB(A) and the 1 kHz sound level was 77 dB(A). By means of the influencing according to the invention, thus with activated piezoelements caused to carry out secondary vibrations, the airborne sound level was 78 dB(A) and the 1 kHz sound level was 72 dB(A). Even if the arrangement of the piezoelements is not optimized, this indicates a reduction of the perceivable sound effect with respect to the airborne sound level of 2 dB(A) and with respect to the 1 kHz sound level of 6 dB(A).

As the result of the 'in situ' determination of the actually existing transmitted vibration, the secondary vibration can always be changed as a function of the transmitted vibration.

Instead of the determination of the actually existing transmitted vibration, for generating the secondary vibrations, a transmitted vibration can also be used which is determined by means of examples and which, in the case of motor vehicles operated by an engine and here particularly of automobiles, is preferably determined by a parameter, such as the rotational speed, the crankshaft angle and/or the load, etc. In this case, the data required for generating the secondary vibration are then advantageously obtained from a data memory in which they are filed. This data set can especially be changed in a targeted manner. For this purpose, the corresponding system must be constructed as a learning system.

In the case of an active seal 1 having contacts 5, the seal 1 is preferably arranged to be constructionally aligned, for example, by means of a groove. The targeted alignment of the seal 1 has the purpose of providing that the active axis of the piezoelements 4', 4" points at least approximately in the direction of the highest amplitude and/or in the power flux direction.

Furthermore, as the result of a corresponding physical design of the seal 1 and of the receiving device of the seal, the location of the piezoelement 4', 4" can also be determined relative to its installation site.

In the case of the controllable piezoelements 4' and 4", particularly in the case of the piezoelements 4' and 4" arranged in the active seals 1, a special advantage is also the fact that, as the result of the arrangement of the piezoelement in the edge area of the window and in the area of the transition between the window pane 3 and the window frame 2, only small deviations are required for influencing the sound effect. This applies to the generating and/or increasing of a certain sound impression as well as to the reduction and/or suppression of certain noises.

In addition, because of the small deviations and the low leakage current in the case of piezoelements, the energy consumption for this influencing is advantageously low.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for influencing at least one of structure-borne sound conductions and noise radiations of objects which have at least two components being at least indirectly mutually adjoining and mutually connected, arranging a spacer body proximate an at least indirectly mutually adjoining area of the at least two components, wherein said spacer body has a controllably influenceable geometry, and wherein the at least two components connected with one another by way of the spacer body are dimensioned with different acoustic impedances with respect to conduction of the structure-borne sound.

2. Method according to claim 1, wherein secondary vibrations are introduced by way of the spacer body in a range of high modes of the structure-borne sound.

3. Method according to claim 1, wherein a ratio of the acoustic impedances of the two mutually adjoining components is lower than 1:2.

4. Method according to claim 1, wherein a ratio of the acoustic impedances of the two mutually adjoining components is lower than 1:5.

5. Method according to claim 1, wherein a ratio of the acoustic impedances of the two mutually adjoining components is lower than 1:10.

6. Method according to claim 1, wherein one of a joint, a flange and a partition line is selected as the at least indirectly mutually adjoining area.

7. Method according to claim 1, wherein one of said at least two components is a panel, a casing plate, a window pane, a covering part, or a metal body sheet of a motor vehicle or of an airplane.

8. Method according to claim 1, wherein said spacer body is made of a shape memory metal.

9. Method according to claim 1, wherein said spacer body is a piezoelement made of a piezoelectrically active material.

10. Method according to claim 9, wherein the piezoelement is arranged in a seal.

11. Method according to claim 9, wherein the piezoelement is controlled based on data obtained from a data set.

12. Method according to claim 9, wherein the piezoelement is arranged in one of a range of an amplitude or of a high mode density and a range of highest contact pressure of transmitted vibration between the at least two components.

13. Method according to claim 1, wherein at least one of said at least two components is one of a valve covers a cylinder head, an engine block or cylinder block, a crankshaft, a crankshaft housing, an oil pan, an engine mount, an engine bearing, a clutch housing or automatic transmission housing and a gear case of an engine, and wherein the spacer body is arranged in a partition line between the at least two components.

14. System for influencing at least one of structure-borne sound conductions and noise radiations of objects which have at least two components at least indirectly mutually adjoining and mutually connected, a spacer body being arranged proximate an at least indirectly mutually adjoining area of the at least two components, wherein the spacer body has a controllably influenceable geometry, and wherein the at least two components mutually connected by way of the spacer body have different acoustic impedances with respect to conduction of the structure-borne sound.

15. System according to claim 14, wherein a ratio of the acoustic impedances of the two mutually adjoining components is lower than 1:2.

16. System according to claim 14, wherein a ratio of the acoustic impedances of the two mutually adjoining components is lower than 1:5.

17. System according to claim 14, wherein a ratio of the acoustic impedance of the two mutually adjoining components is lower than 1:10.

18. System according to claim 14, wherein the spacer body is made of a shape memory metal.

19. System according to claim 14, wherein the spacer body has a piezoelement.

20. System according to claim 19, wherein the piezoelement is connected with a control unit, and wherein the piezoelement can be excited by way of the control unit to carry out secondary vibrations.

21. System according to claim 20, wherein the system has a data memory, and wherein data for controlling the secondary vibrations is obtained from a data set filed in the data memory.

22. System according to claim 19, wherein the piezoelement is arranged in one of a range of an amplitude or of a high mode density and a highest effective pressure of vibration transmitted in the at least indirectly mutually adjoining area.

23. System according to claim 14, wherein at least one of the at least two components is made of one of sheet metal, cast iron and glass.

24. System according to claim 14, wherein at least one of said at least two components is one of a valve cover, a cylinder head, an engine block or cylinder block, a crankshaft, a crankshaft housing, an oil pan, an engine mounts an engine bearing, a clutch housing or automatic transmission housing and a gear case of an engine and wherein the spacer body is arranged in a partition line between the at least two components.

25. System according to claim 14, wherein at least one of said at least two components is a holding device of an assembly or of an add-on part.

26. System according to claim 14, wherein one of said at least two components is a plate-shaped covering element of a body of a motor vehicle or of an airplane.

27. System according to claim 14, wherein the spacer body is a seal in which at least one piezoelement is arranged.

28. System according to claim 27, wherein the at least one piezoelement is arranged in the seal in an oriented manner, and wherein the oriented manner is approximately parallel to a force direction of expected transmitted vibrations on the components.

29. System according to claim 27, wherein the seal is electrically contacted, by contacts and wherein the contacts are arranged in a wall area of the seal.

30. System according to claim 27, wherein the seal has a matrix made of a plastic material.

31. System according to claim 27, wherein the piezoelements are arranged in the seal in a separate and arbitrarily distributed manner constituting a 0-3 piezoceramic polymer composite.

32. System according to claim 28, wherein the piezoelements are arranged in the seal in a separate and aligned manner and are electrically contacted constituting a 1-3 piezoceramic polymer composite.

33. System according to claim 27, wherein active axes of the piezoelements are aligned at least approximately parallel to a deflection and force direction of an amplitude of transmitted vibrations.

34. System according to claim 27, wherein sensors for vibrations are arranged in the seal.

35. System according to claim 27, wherein said at least one piezoelement is divided into two sectors, one sector being a piezoactuator and the other sector being a sensor.

36. System according to claim 30, wherein the plastic material is an elastomer.

* * * * *